US00RE43479E

(19) United States
(12) Reissued Patent
Jung

(10) Patent Number: US RE43,479 E
(45) Date of Reissued Patent: Jun. 19, 2012

(54) COLOR INTERPOLATION METHOD

(75) Inventor: Byung-Geun Jung, Gyounggi-do (KR)

(73) Assignee: Intellectual Ventures II LLC, Wilmington, DE (US)

(21) Appl. No.: 13/031,377

(22) Filed: Feb. 21, 2011

Related U.S. Patent Documents

Reissue of:
(64) Patent No.: 7,496,231
Issued: Feb. 24, 2009
Appl. No.: 11/093,114
Filed: Mar. 28, 2005

(30) Foreign Application Priority Data

Apr. 21, 2004 (KR) ..... 10-2004-0027520

(51) Int. Cl.
*G06K 9/48* (2006.01)

(52) U.S. Cl. ..... 382/199; 382/300; 382/308

(58) Field of Classification Search ..... 382/199, 382/205, 300
See application file for complete search history.

(56) References Cited

U.S. PATENT DOCUMENTS

| | | | | |
|---|---|---|---|---|
| 4,780,711 | A | 10/1988 | Doumas | |
| 5,404,411 | A | 4/1995 | Banton et al. | |
| 6,563,537 | B1 | 5/2003 | Kawamura et al. | |
| 6,642,960 | B1 * | 11/2003 | Kohashi et al. | 348/246 |
| 6,920,252 | B2 | 7/2005 | Rouvellou | |
| 7,142,239 | B2 * | 11/2006 | Cho | 348/273 |

FOREIGN PATENT DOCUMENTS

| | | |
|---|---|---|
| JP | 10108208 | 4/1998 |
| KR | 20010005128 | 1/2001 |

OTHER PUBLICATIONS

Wu et al., Color Interpolation for Single CCD Color Camera, Mar. 28-30, 2004, 6th IEEE Southwest Symposium on Image Analysis and Interpretation, pp. 90-94.*
Hsia, Fast High-Quality Color-Filter-Array Interpolation Method for Digital Camera Systems, Jan. 2004, SPIE: Journal of Electronic Imaging, vol. 13 (1), pp. 244-250.*
Pei et al., Effective Color Interpolation in CCD Color Filter Arrays Using Signal Correlation, Jun. 2003, IEEE Transactions on Circuits and Systems for Video Technology, vol. 13 Issue:6,pp. 503-513.*
Korean Office Action, dated Jul. 27, 2010, along with English translation.

* cited by examiner

*Primary Examiner* — Matthew Bella
*Assistant Examiner* — Dennis Rosario
(74) *Attorney, Agent, or Firm* — McAndrews, Held & Malloy, Ltd.

(57) ABSTRACT

Disclosed is a color interpolation method. The present invention decides a precise position of an edge with use of a G value in a unit pixel structure with a size of 3×3, thereby using different color interpolations according to the position of the edge. Also, the present invention provides an effect of emphasizing an edge by emphasizing a brightness and lowering colors when the edge is placed in the vertical center or the horizontal center of the unit pixel structure of 3×3 with use of a property that the edge has stronger brightness than the colors and prevents an incorrect color.

28 Claims, 8 Drawing Sheets

R-Type

R' = CenterC = $R_5$
G' = MissG
B' = CatRB

Gb-Type

R' = $C_1$atG
G' = CenterG = $G_5$
B' = $C_2$atG

Gr-Type

R' = $C_2$atG
G' = CenterG = $G_5$
B' = $C_1$atG

B-Type

R' = CatRB
G' = MissG
B' = Centerc = $B_5$

Horizontal

Vertical

Horizontal Top

Horizontal Bottom

Vertical Left

Vertical Right

<$C_1$atG = CBottom>

Gb-Type $C_1(R) \Rightarrow$ CBottom = $R_8$ (A)

Gr-Type $C_1(B) \Rightarrow$ CBottom = B (B)

<$C_2$atG = CHorizontal>

Gb-Type $C_2(B) \Rightarrow$ CHorizontal = $B_4$, $B_6$ (A)

Gr-Type $C_2(R) \Rightarrow$ CHorizontal = $R_4$, $R_6$ (B)

<CatRB = CBottom>

R-Type

CatRB = CBottom $\Rightarrow B_7, B_9$ (A)

B-Type

CatRB = CBottom $\Rightarrow R_7, R_9$ (B)

<$C_1$atG = CTop>

Gb-Type $C_1(R) \Rightarrow$ CTop = $R_2$ (A)

Gr-Type $C_1(B) \Rightarrow$ CTop = $B_2$ (B)

<$C_2$atG = CHorizental>

Gb-Type $C_2(B) \Rightarrow$ CHorizental = $B_4$, $B_6$ (A)

Gr-Type $C_2(R) \Rightarrow$ CHorizental = $R_4$, $R_6$ (B)

<CatRB = CTop>

R-Type

CatRB = CBottom $\Rightarrow B_1, B_3$ (A)

B-Type

CatRB = CBottom $\Rightarrow R_1, R_3$ (B)

<$C_1$atG = CVertical>

Gb-Type $C_1(R) \Rightarrow$ CVertical $\Rightarrow R_2, R_8$ (A)

Gr-Type $C_1(B) \Rightarrow$ CVertical1 $\Rightarrow B_2, B_8$ (B)

<$C_2$atG = CHorizental>

Gb-Type $C_2(B) \Rightarrow$ CRight = $B_6$ (A)

Gr-Type $C_2(R) \Rightarrow$ CRight = $R_6$ (B)

<CatRB = CRight>

R-Type

CRight $\Rightarrow B_3, B_9$ (A)

B-Type

CRight $\Rightarrow R_3, R_9$ (B)

<$C_1$atG = CVertical>

Gb-Type $C_1$(R) ⇒CVertical ⇒ $R_2$, $R_8$ (A)

Gr-Type $C_1$(B) ⇒CVertical ⇒ $B_2$, $B_8$ (B)

<$C_2$atG = CLeft>

Gb-Type $C_2$(B) ⇒ CLeft = $B_4$ (A)

Gr-Type $C_2$(R)⇒ CLeft = $R_4$ (B)

<CatRB = CLeft>

R-Type

CLeft ⇒ $B_1$, $B_7$ (A)

B-Type

CLeft ⇒ $R_1$, $R_7$ (B)

COLOR INTERPOLATION METHOD

Matter enclosed in heavy brackets [ ] appears in the original patent but forms no part of this reissue specification; matter printed in italics indicates the additions made by reissue.

FIELD OF THE INVENTION

The present invention relates to a color interpolation method of an image sensor; and more particularly, to a color interpolation method considering edges at a complementary metal oxide semiconductor (CMOS) device.

DESCRIPTION OF RELATED ARTS

An image sensor is a device producing an image by using a characteristic that a semiconductor device reacts to a light. That is, a pixel detects different brightness and wavelengths of lights coming from each different subject and produces the lights in an electrical value. Herein, the image sensor serves a role in converting this electrical value into a level capable of performing a signal processing.

When obtaining perfect red, green and blue colors from products using the image sensor, there are three methods to be used. A first method is to obtain an average value of red, green and blue values coming from the image sensor by using a peripheral pixel of 3×3. A second method is to obtain the average value by aligning the red, green and blue values according to a size of the each color. A third method is to replace the red, green and blue colors with an adjacent pixel. However, by obtaining the average value or replacing the colors, the edges can be damaged in an image or a false color can be generated. There is a conventional color interpolation method considering the edges, however, the conventional color interpolation method only detects edges in a horizontal or a vertical direction. Accordingly, the color interpolation cannot consider fine edges and correct the colors with characteristics of the edges.

SUMMARY OF THE INVENTION

It is, therefore, an object of the present invention to provide a color interpolation method capable of keeping characteristics of edges by considering fine edges.

In accordance with one aspect of the present invention, there is provided a color interpolation method, including the steps of: defining four R-type, B-type, Gb-type and Gr-type unit pixel structures with a size of 3×3 comprised of one pixel subjected to the color interpolation and eight pixels surrounding the pixel subjected to the color interpolation, wherein the R-type unit pixel structure is comprised of a first pixel of the R-type $B_1$, a second pixel of the R-type $G_2$, a third pixel of the R-type $B_3$, a fourth pixel of the R-type $G_4$, a fifth pixel of the R-type $R_5$, a sixth pixel of the R-type $G_6$, a seventh pixel of the R-type $B_7$, an eight pixel of the R-type $G_8$ and a ninth pixel of the R-type $B_9$, the Gb-type unit pixel is comprised of a first pixel of the Gb-type $G_1$, a second pixel of the Gb-type $R_2$, a third pixel of the Gb-type $G_3$, a fourth pixel of the Gb-type $B_4$, a fifth pixel of the Gb-type $G_5$, a sixth pixel of the Gb-type $B_6$, a seventh pixel of the Gb-type $G_7$, an eight pixel of the Gb-type $R_8$ and a ninth pixel of the Gb-type $G_9$, the Gr-type is comprised of a first pixel of the Gr-type $G_1$, a second pixel of the Gr-type $B_2$, a third pixel of the Gr-type $G_3$, a fourth pixel of the Gr-type $R_4$, a fifth pixel of the Gr-type $G_5$, a sixth pixel of the Gr-type $R_6$, a seventh pixel of the Gr-type $G_7$, an eight pixel of the Gr-type $B_8$ and a ninth pixel of the $G_9$ and the B-type is comprised of a first pixel of the B-type $R_1$, a second pixel of the B-type $G_2$, a third pixel of the B-type $R_3$, a fourth pixel of the B-type $G_4$, a fifth pixel of the B-type $B_5$, a sixth pixel of the B-type $G_6$, a seventh pixel of the B-type $R_7$, an eight pixel of the B-type $G_8$ and a ninth pixel of the B-type $R_9$; defining R', G' and B' that are representative values of R, G and B at the four unit pixel structures with the size of 3×3; deciding one of the four unit pixel structures with the size of 3×3 that the corresponding pixel is falling under for performing the color interpolation with respect to the corresponding pixel; judging whether an edge exists in one of a horizontal direction and a vertical direction at the unit pixel structure as the unit pixel structure is decided; judging whether the edge exists in one of a horizontal top direction and a horizontal bottom direction as the corresponding unit pixel structure has the horizontal edge and judging whether the edge exists in one of a vertical left direction and a vertical right direction as the corresponding unit pixel structure has the vertical direction; judging whether the edge exists in the center as the edge existing one of the horizontal top direction and the horizontal bottom direction and the edge existing one of the vertical left direction and the vertical right direction are checked; and performing the color interpolation according to all the discriminated edges by using the surrounding pixels except for the pixels where the edge exists, wherein the color interpolation is performed by making the values of R, G and B identically as the edge exists in the center, thereby lowering a color and emphasizing a brightness.

BRIEF DESCRIPTION OF THE DRAWINGS

The above and other objects and features of the present invention will become better understood with respect to the following description of the preferred embodiments given in conjunction with the accompanying drawings, in which.

DETAILED DESCRIPTION OF THE INVENTION

Hereinafter, a color interpolation method in accordance with embodiments of the present invention will be described with reference to the accompanying drawings. Furthermore, reference denotations of R, G and B denote a red color, a green color and a blue color, respectively.

FIGS. 1A to 1E are diagrams illustrating four different type unit pixel structures of 3×3 for sampling edges, respectively.

Figure 1A:
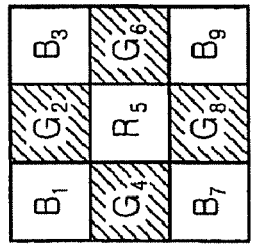
FIGS. 1A to 1E are diagrams illustrating four unit pixel structures of 3×3 for sampling edges in accordance with the present invention.

FIG. 1A illustrates an R-type unit pixel structure having an R in the center. The fifth pixel of the R-type unit pixel structure $R_5$ in the center is surrounded by four G pixels, i.e., a second pixel of the R-type $G_2$, a fourth pixel of the R-type $G_4$, a sixth pixel of the R-type $G_6$ and an eight pixel of the R-type $G_8$, in the top, the bottom, the left and the right and four B pixels, i.e., a first pixel of the R-type $B_1$, a third pixel of the R-type $B_3$, a seventh pixel of the R-type $B_7$ and a ninth pixel of the R-type $B_9$, in the four corners of the unit pixel structure in diagonal directions. In case of not considering edges, each representative value of R, G and B, i.e., R', G' and B', can be expressed with the following mathematics formula 1.

$$R'=CenterC=R_5$$

$$G'=MissG$$

$$B'=CatRB \qquad \text{[Mathematics Formula 1]}$$

Herein, C denotes a color, thereby denoting color information, R and B. That is, the representative value of R, i.e., R', denotes R or B in the center and since the fifth pixel of the R-type $R_5$ is placed in the center, the formula denoting $R'=R_5$ can be formed.

Miss means missing. The fifth pixel of the R-type $R_5$ is placed in the center and the second pixel of the R-type $G_2$, the fourth pixel of the R-type $G_4$, the six pixel of the R-type $G_6$ and the eight pixel of the R-type $G_8$ are placed in the top, the bottom, the right and the left of $R_5$ in the center. However, there is not G in the center of the R-type, thereby denoting this structure with MissG. At this time, methods to obtain the representative value of G, i.e., G', are various such as taking an average value of the four G pixels, i.e., the second pixel of the R-type $G_2$, the fourth pixel of the R-type $G_4$, the six pixel of the R-type $G_6$ and the eight pixel of the R-type $G_8$ or taking a mean value of the aforementioned four G pixels.

CatRB denotes colors other than the colors corresponding to the R-type or B-type unit pixel structure. Accordingly, CatRB means the representative value of B, i.e., B' and can be obtained by using the four B pixels in the corners, i.e., the first pixel of the R-type $B_1$, the third pixel of the R-type $B_3$, the seventh pixel of the R-type $B_7$ and the ninth pixel of the R-type $B_9$.

Figure 1B:
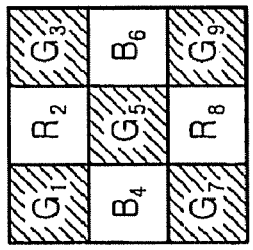

FIG. 1B illustrates a Gb-type unit pixel structure having a G pixel in the center and B pixels in the left and the right of the center. A fifth pixel $G_5$ of the Gb-type in the center is surrounded by four G pixels, i.e., a first pixel of the Gb-type $G_1$, a third pixel of the Gb-type $G_3$, a seventh pixel of the Gb-type $G_7$ and a ninth pixel of the Gb-type $G_9$, in the corners in diagonal directions, two R pixels, i.e., a second pixel of the Gb-type $R_2$, and an eight pixel of the Gb-type $R_8$, in the top and the bottom of the center, and two B pixels, i.e., a fourth pixel of the Gb-type $B_4$ and a sixth pixel of the Gb-type $B_6$, in the left and the right of the center. In case of not considering the edges, each representative value of R, G and B, i.e., R', G' and B', with respect to the fifth pixel of the Gb-type $G_5$ can be expressed with the following mathematics formula 2.

$$R'=C_1atG$$

$$G'=CenterG=G_5$$

$$B'=C_2atG \qquad \text{[Mathematics Formula 2]}$$

Herein, C includes both R and B. What is placed in the top and the bottom of the fifth pixel of the Gb-type $G_5$ is $C_1$ and what is placed in the left and the right of the fifth pixel of the Gb-type $G_5$ is $C_2$.

Accordingly, the representative value of R, i.e., R', can be obtained by using the second pixel of the Gb-type $R_2$ and the eight pixel of the Gb-type $R_8$ denoting R that is $C_1$ in the Gb-type unit pixel structure. For instance, the representative value of R, i.e., R', can be obtained by using an average value of the second pixel of the Gb-type $R_2$ and the eight pixel of the Gb-type $R_8$. The representative value of G, i.e., G', is $G_5$ that is in the center denoted as CenterG.

The representative value of B, i.e., B', can be obtained by using $B_4$ and $B_6$ denoting B that is $C_2$ at the Gb-type unit pixel structure. That is, the representative value of B, i.e., B', can be obtained by using an average value of the fourth pixel of the Gb-type $B_4$ and the sixth pixel of the Gb-type $B_6$.

Figure 1C:
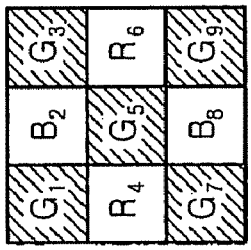

FIG. 1C illustrates a Gr-type unit pixel structure having a G pixel in the center and two R pixels in the left and the right of the center. A fifth pixel of the Gr-type $G_5$ in the center is surrounded by four G pixels, i.e., a first pixel of the Gr-type $G_1$, a third pixel of the Gr-type $G_3$, a seventh pixel of the Gr-type $G_7$ and a ninth pixel of the Gr-type $G_9$, in the corners in diagonal directions, two B pixels, i.e., a second pixel of the Gr-type $B_2$ and an eight pixel of the Gr-type $B_8$ in the top and the bottom of the center and two R pixels, i.e., a fourth pixel of the Gr-type $R_4$ and a sixth pixel of the Gr-type $R_6$ in the left and the right of the center. In case of not considering the edges, each representative value of R, G and B, i.e., R', G' and B', with respect to the fifth pixel of the Gr-type $G_5$ can be expressed with the following mathematics formula 3.

$$R'=C_2atG$$

$$G'=CenterG=G_5$$

$$B'=C_1atG \qquad \text{[Mathematics Formula 3]}$$

Herein, C includes both R and B. What is placed in the top and the bottom of the fifth pixel of the Gr-type $G_5$ in the center denoted as CenterG is $C_1$ and what is placed in the left and the right of the fifth pixel of the Gr-type $G_5$ is $C_2$.

Accordingly, the representative value of B, i.e., B', can be obtained by using the second pixel of the Gr-type $B_2$ and the eight pixel of the Gr-type $R_8$ denoting B that is $C_1$ in the Gr-type unit pixel structure. For instance, the representative value of B, i.e., B', can be obtained by using an average value of the second pixel of the Gr-type $B_2$ and the eight value of the Gr-type $B_8$. The representative value of G, i.e., G', is $G_5$ in the center denoted as CenterG.

The representative value of R, i.e., R', can be obtained by using the fourth pixel of the Gr-type $R_4$ and the sixth pixel of the Gr-type $R_6$ denoting R that is $C_2$ in the Gr-type unit pixel structure. For instance, the representative value of R, i.e., R', can be obtained by using an average value of the fourth pixel of the Gr-type $R_4$ and the sixth pixel of the Gr-type $R_6$.

Figure 1D:
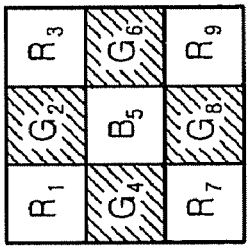

FIG. 1D illustrates a B-type unit pixel structure having a B pixel in the center. A fifth pixel of the B-type $B_5$ in the center is surrounded by four G pixels, i.e., a second pixel of the B-type $G_2$, the fourth pixel of the B-type $G_4$ and the sixth pixel of the B-type $G_6$ and the eight pixel of the B-type $G_8$, in the top, the bottom, the left and the right of the center and four R pixels, i.e., a first pixel of the B-type $R_1$, a third pixel of the B-type $R_3$, a seventh pixel of the B-type $R_7$ and a ninth pixel of the B-type $R_9$ in the corners in diagonal directions. In case of not considering the edges, each representative value of R, G and B, i.e., R', G' and B', with respect to the fifth pixel of the B-type $B_5$ can be expressed with the following mathematics formula 4.

$$R'=CatRB$$

$$G'=MissG$$

$$B'=CenterC=B_5 \quad \text{[Mathematics Formula 8]}$$

Herein, assuming that the representative value of B, i.e., B', has the fifth pixel of the B type, the formula denoting $B'=B_5$ can be formed.

Miss means missing. The fifth pixel of the B-type $B_5$ is placed in the center and the second pixel of the B-type $G_2$, the fourth pixel of the B-type $G_4$, the sixth pixel of the B-type $G_6$ and the eight pixel of the B-type $G_8$ are in the top, the bottom, the left and the right of the center. However, there is not the G pixel in the center, thereby denoting this structure with MissG. At this time, methods to obtain the representative value of G, i.e., G', are various such as taking an average value of the four G pixels, i.e., the second pixel of the B-type $G_2$, the fourth pixel of the B-type $G_4$, the sixth pixel of the B-type $G_6$ and the eight pixel of the B-type $G_8$ or a mean value of the aforementioned G pixels.

CatRB denotes a color other than the colors corresponding to the R-type or B-type unit pixel structure. Accordingly, CatRB means the representative value of R, i.e., R' and can be obtained by using the four surrounding R pixels, i.e., the first pixel of the B-type $R_1$, the third pixel of the B-type $R_3$, the seventh pixel of the B-type $R_7$ and the ninth pixel of the B-type $R_9$.

In accordance with the present invention, the color interpolation method considering the edges corrects the color pixels R and B by considering changed amounts of the R and B pixels, which is. not a simple change, in case of that the G pixel is placed in the center of the unit pixel structure with the size of 3×3 by detecting the edges with use of G in different methods according to each case from a bayer color pattern shown in FIG. 1.

Figure 1E:
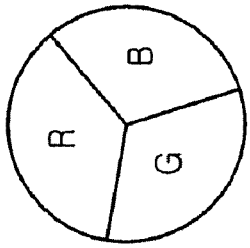

FIG. 1E illustrates a case expressing the pixel in the center with the representative values of R, G and B, i.e., R', G' and B', by using each of the unit pixel structure shown in FIGS. 1A to 1D.

Meanwhile, the following table 1 expresses each color C, i.e., R and B colors, in accordance with the above described four unit pixel structures.

TABLE 1

| | R-type | Gb-type | Gr-type | B-type |
|---|---|---|---|---|
| CTop | $(B_1+B_3)/2$ | $R_2$ | $B_2$ | $(R_1+R_3)/2$ |
| CBottom | $(B_7+B_9)/2$ | $R_8$ | $B_8$ | $(R_7+R_9)/2$ |
| CLeft | $(B_1+B_7)/2$ | $B_4$ | $R_4$ | $(R_1+R_7)/2$ |
| CRight | $(B_3+B_9)/2$ | $B_6$ | $R_6$ | $(R_3+R_9)/2$ |

Referring to Table 1, a value of the color C on each corresponding horizontal or vertical line can be expressed with using an average value or a representative value of the color C of the existing R or B.

Figure 2A:
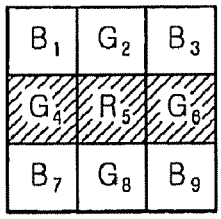
FIGS. 2A to 2B are diagrams illustrating an embodiment obtaining a first edge at a red (R)-type unit pixel structure in accordance with the present invention.
Figure 2B:
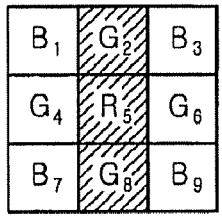

FIGS. 2A and 2B are diagrams illustrating an embodiment obtaining a first edge at the R-type unit pixel structure.

A judgment of the first edge decides whether the edge is horizontal or vertical by using a difference in the G pixels, i.e., the second pixel of the G-type $G_2$, the fourth pixel of the G-type $G_4$, the sixth pixel of the G-type $G_6$ and the eight pixel of the G-type $G_8$. That is, the judgment of the first edge is performed by using a difference between a changed amount of a horizontal direction, i.e., ΔGH, and a changed amount of a vertical direction, i.e., ΔGV.

The following mathematics formula 5 illustrates a method for obtaining the first edge.

$$\text{First-Edge} = \begin{pmatrix} \text{Vertical}, \Delta GH \geq \Delta GV \\ \text{Horizontal}, \text{Otherwise} \end{pmatrix} \quad \text{[Mathematics Formula 5]}$$

That is, if the changed amount of the horizontal direction, i.e., ΔGH, is equal to or greater than the changed amount of the vertical direction, i.e., ΔGV, the edge is placed in the vertical direction as shown in FIG. 2B and if the changed amount of the horizontal direction, i.e., ΔGH, is equal to or less than the changed amount of the vertical direction, i.e., ΔGV, the edge is placed in the horizontal direction as shown in FIG. 2A.

Since the R-type unit pixel structure is exemplified herein, ΔGH denoting the changed amount of the horizontal direction is $|G_4-G_6|$ and ΔGV denoting the changed amount of the vertical direction is $|G_2-G_8|$.

FIGS. 3A to 3D are diagrams illustrating another embodiment obtaining a second edge at the R-type unit pixel structure.

A method for judging the second edge judges whether the edge is horizontal, i.e., a left-center-right direction or vertical, i.e., a top-center-bottom direction, by using a value of the G pixel placed in the center and the corners.

A position of the second edge depends on the position of the first edge. That is, if the first edge is horizontal, a horizontal top direction and a horizontal bottom direction should be first identified and then, it is necessary to judge whether the first edge is in a horizontal center direction.

In case of that the first edge is vertical, a vertical left direction and a vertical right direction is first identified and then, it is necessary to judge whether the fist edge is in a vertical center direction.

This standard for judgment is attainable by comparing a changed amount of a top-center direction, i.e., ΔGTC, with a changed amount of a bottom-center direction, i.e., ΔGBC, and a changed amount of a left-center direction, i.e., ΔGLC, with a changed amount of a right-center direction, i.e., ΔGRC.

For instance, in the R-type unit pixel structure, the changed amount of the top-center direction, i.e., ΔGTC, the changed amount of the bottom-center direction, i.e., ΔGBC, the changed amount of the left-center direction, i.e., ΔGLC and the changed amount of the right-center direction, i.e., ΔGRC can be obtained as follows.

$$\Delta GTC=|G_2-G'|$$

$$\Delta GBC=|G_8-G'|$$

$$\Delta GLC=|G_4-G'|$$

$$\Delta GRC=|G_6-G'| \quad \text{[Mathematics Formula 6]}$$

Herein, the representative value of G, i.e., G', is the R-type, thereby meaning MissG.

A classification of the horizontal top direction and the horizontal bottom direction is arranged due to the comparison of ΔGTC and ΔGBC and a classification of the vertical left direction and the vertical right direction is arranged due to the comparison of ΔGLC and ΔGRC.

The following mathematics formula 7 illustrates a distribution of the four types of the edge identified by the above comparisons.

Second-Edge = [Mathematics Formula 7]

$$\begin{pmatrix} \text{Horizontal Center} = \text{Horizontal}, \\ \Delta GTC > \Delta GBC \\ \text{Horizontal Bottom}, \\ \text{FirstEdge} = \text{Horizontal}, \ \Delta GTC \leq \Delta GBC \\ \text{Vertical Left}, \\ \text{FirstEdge} = \text{Vertical}, \ \Delta GLC > \Delta GRC \\ \text{Horizontal Bottom}, \\ \text{FirstEdge} = \text{Horizontal}, \ \Delta GTC \leq \Delta GBC \\ \text{Vertical Right}, \\ \text{FirstEdge} = \text{Vertical}, \ \Delta GLC \leq \Delta GRC \end{pmatrix}$$

Figure 3A:
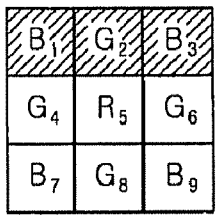
FIGS. 3A to 3D are diagrams illustrating another embodiment obtaining a second edge at an R-type unit pixel structure in accordance with the present invention.

Herein, as for Horizontal Top that is the first one, if the first edge is horizontal and the changed amount of the top-center direction is greater than the changed amount of the bottom-center direction, i.e., $\Delta GTC > \Delta GBC$, the edge is placed in the horizontal top direction crossing $B_1$, $G_2$ and $B_3$ in FIG. 3A.

Figure 3B:
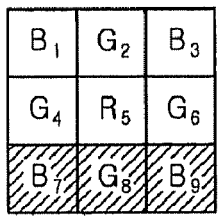

As for Horizontal Bottom that is the second one, if the first edge is horizontal and the changed amount of the bottom-center direction is equal to or less than the changed amount of the top-center direction, i.e., $\Delta GTC \leqq \Delta GBC$, the edge is placed in the horizontal bottom direction crossing $B_7$, $G_8$ and $B_9$ as shown in FIG. 3B.

Figure 3C:
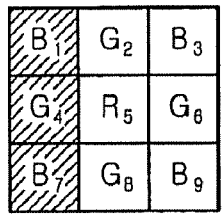

As for Vertical Left that is the third one, if the first edge is vertical and the changed amount of the left-center direction is greater than the changed amount of the right-center direction, i.e., $\Delta GLC > \Delta GRC$, the edge is placed in the vertical left direction crossing $B_1$, $G_4$ and $B_7$ as shown in FIG. 3C.

Figure 3D:
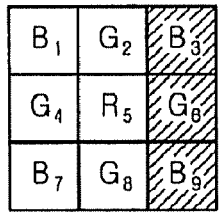

As for Vertical Right that is the fourth one, if the first edge is vertical and the changed amount of the right-center direction is equal to or greater than the changed amount of the left-center direction, i.e., $\Delta GLC \leqq \Delta GRC$, the edge is placed in the vertical right direction crossing $B_3$, $G_6$ and $B_9$ as shown in FIG. 3D.

Furthermore, whether the edge crosses the center of the unit pixel structure of 3×3 is also judged.

That is, when checking an existence of the first edge, if a difference, i.e., $|\Delta GH - \Delta GV|$, between the changed amount of the horizontal direction, i.e., $\Delta GH$ and the changed amount of the vertical direction, i.e., $\Delta GV$, is greater than an optional edge threshold, i.e., Eth, the first edge exists in the center of either the horizontal direction or the vertical direction.

When checking an existence of the second edge, if both a difference between the changed amount of the left-center direction and the changed amount of the right-center direction, i.e., $|\Delta GLC - \Delta GRC|$, and a difference between the changed amount of the top-center direction and the changed amount of the bottom-center direction, i.e., $|\Delta GTC - \Delta GBC|$, are greater than the optional edge threshold, i.e., Eth, the second edge precisely passes from the center to either the horizontal or the vertical direction.

The following mathematics formula 8 illustrates an embodiment checking the existence of the edge in the center when deciding the second edge.

Center Edge = [Mathematics Formula 8]

$$\begin{pmatrix} \text{Existence}, |\Delta GH - \Delta GV| > \text{Eth}, \\ |\Delta GTC - \Delta GBC| < \text{Eth} \\ \text{Existence}, \ |\Delta GH - \Delta GV| > \text{Eth}, \\ |\Delta GLC - \Delta GRC| < \text{Eth} \\ \text{Absence}, \ \text{Otherwise} \end{pmatrix}$$

Referring to Mathematics Formula 8, if the difference between the changed amount of the vertical direction, i.e., $\Delta GV$, and the changed amount of the horizontal direction, i.e., $\Delta GH$, is greater than the edge threshold, i.e., Eth, the edge exists in the center. At this time, the difference between the changed amount of the top-center direction, i.e., $\Delta GTC$, and the changed amount of the bottom-center direction, i.e., $\Delta GTC$, is less than the edge threshold, i.e., Eth, the edge precisely exists in the horizontal center direction.

If the difference between the changed amount of the vertical direction, i.e., $\Delta GV$, and the changed amount of the horizontal direction, i.e., $\Delta GV$, is greater than the edge threshold, i.e., Eth, the edge exits in the center. At this time, the difference between the changed amount of the left-center direction, i.e., $\Delta GLC$, and the changed amount of the right-center direction, i.e., $\Delta GRC$, is less than the edge threshold, i.e., Eth, the edge precisely exists in the vertical center.

On the other side, if the difference between the changed amount of the vertical direction, i.e., $\Delta GV$, and the changed amount of the horizontal direction, i.e., $\Delta GH$, is less than the edge threshold, i.e., Eth, the edge does not exist.

Hereinafter, steps of obtaining values of R and B according to locations of each edge except the center will be examined.

Figure 4A:
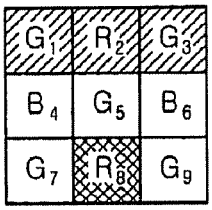
FIGS. 4A to 4C are diagrams illustrating corrections of red (R) and blue (B) values in case of placing an edge over a horizontal line in accordance with the present invention.
Figure 4A:
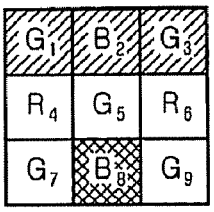
Figure 4B:
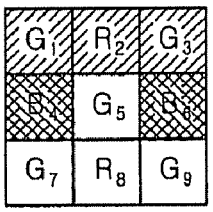
Figure 4B:
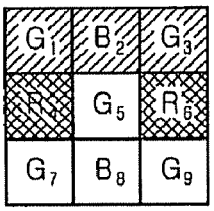
Figure 4C:
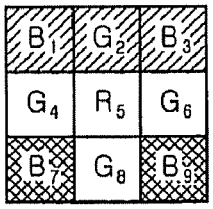
Figure 4C:
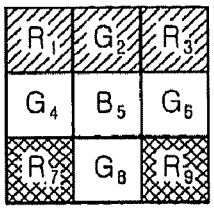

FIGS. 4A to 4C are diagrams illustrating corrections of the values of R and B when an edge is placed on a horizontal direction FIGS. 4A and 4B illustrate a Gb-type unit pixel structure and a Gr-type unit pixel structure when the edge is placed on the horizontal direction, respectively.

Herein, the formula denoting $C_1$atG=CBottom is realized. As for the Gb-type shown in Section (A) of FIG. 4A, the values of R and B are corrected by using the fourth pixel of the Gb-type $B_4$, the fifth pixel of the Gb-type $G_5$, the sixth type of the Gb-type $B_6$, the seventh type of the Gb-type $G_7$, the eight pixel of the Gb-type $R_8$ and the ninth pixel of the Gb-type $G_9$ except for the first pixel of the Gb-type $G_1$, the second pixel of the Gb-type $R_2$ and the third pixel of the Gb-type $G_3$ in which the edge exists. Since the unit pixel structure is the Gb-type, $C_1$ is R and there is only the eight pixel of the Gb-type $R_8$ in the center bottom CBottom. Accordingly, the representative value of R, i.e., R', of the fifth pixel of the Gb-type $G_5$ can be replaced by using the eight pixel of the Gb-type $R_8$ except for the second pixel of the Gb-type $R_2$ in case of the Gb-type of which the edge exists on the horizontal direction.

Meanwhile, in case of the Gr-type shown in Section (B) of FIG. 4A, the values of R and B are corrected by using the fourth pixel of the Gr-type $R_4$, the fifth pixel of the Gr-type $G_5$, the sixth pixel of the Gr-type $R_6$, the seventh pixel of the Gr-type $G_7$, the sixth pixel of the Gr-type $B_8$ and the ninth pixel of the Gr-type $G_9$ except for the first pixel of the Gr-type $G_1$, the second pixel of the Gr-type $B_2$ and the third pixel of the Gr-type $G_3$ where the edge exists. In case of the Gr-type where the edge exists in the horizontal direction, since the unit pixel structure is -the Gr-type, $C_1$ is B and only $B_8$ exists in the center bottom CBottom. Accordingly, the representative value of B, i.e., B', of the fifth pixel of the Gr-type $G_5$ can be replaced by using only the eight pixel of the Gr-type $B_8$ except for the second pixel of the Gr-type $B_2$.

Sections (A) and (B) of FIG. 4B illustrate the Gb-type and the Gr-type when the edge is placed on the horizontal direction, respectively.

Herein, the formula denoting $C_2$atG=CHorizontal is realized. As for the Gb-type shown in section (A) of FIG. 4B, the values of R and B are corrected by using the fourth pixel of the Gb-type $B_4$, the fifth pixel of the Gb-type $G_5$, the sixth pixel of the Gb-type $B_6$, the seventh pixel of the Gb-type $G_7$, the eight pixel of the Gb-type $R_8$ and the ninth pixel of the Gb-type $R_9$ except for the first pixel of the Gb-type $G_1$, the second pixel of the Gb-type $R_2$ and the third pixel of the Gb-type $G_3$ in which the edge exists. Since the unit pixel structure is the Gb-type, $C_2$ is B and only the fourth pixel of the Gb-type $B_4$ and the sixth pixel of the Gb-type $B_6$ exist in the horizontal center direction CHorizontal. Accordingly, the representative value of B, i.e., B', of the fifth pixel of the Gb-type $G_5$ is corrected by using the fourth pixel of the Gb-type $B_4$ and the sixth pixel of the Gb-type $B_6$, i.e., an average value of the fourth pixel of the Gb-type $B_4$ and the sixth pixel of the Gb-pixel $B_6$, in case of the Gb-type where the edge exists on the horizontal direction.

Meanwhile, in case of the Gr-type shown in Section (B) of FIG. 4B, the values of R and B are corrected by using the fourth pixel of the Gr-type $B_4$, the fifth pixel of the Gr-type $G_5$, the sixth pixel of the Gr-type $B_6$, the seventh pixel of the Gr-type $G_7$, the eight pixel of the Gr-type $R_8$ and the ninth pixel of the Gr-type $G_9$ except for the first pixel of the Gr-type $G_1$, the second pixel of the Gr-type $R_2$ and the third pixel of the Gr-type $G_3$ where the edge exists. Since the unit pixel structure is the Gr-type, the second pixel of the Gr-type $C_2$ is R and the fourth pixel of the Gr-type $R_4$ and the sixth pixel of the Gr-type $R_6$ exist in the horizontal center direction CHorizontal. Accordingly, the representative value of R, i.e., R', of the fifth pixel of the Gr-type $G_5$ is corrected by using the fourth pixel of the Gr-type $R_4$ and the sixth pixel of the Gr-type $R_6$, i.e., an average value of the fourth pixel of the Gr-type $R_4$ and the sixth pixel of the Gr-type $R_6$, in case of the Gr-type where the edge exists on the horizontal direction.

Sections (A) and (B) of FIG. 4C illustrate the R-type and the B-type when the edge exists on the horizontal direction, respectively.

Herein, the formula denoting CatRB=CBottom is realized. As for the R-type shown in Section (A) of FIG. 4C, the values of R and B are corrected by using the fourth pixel of the R-type $G_4$, the fifth pixel of the R-type $R_5$, the sixth pixel of the R-type $G_6$, the seventh pixel of the R-type $B_7$, the eight pixel of the R-type $G_8$ and the ninth pixel of the R-type $B_9$ except for the first pixel of the R-type $B_1$, the second pixel of the R-type $G_2$ and the third pixel of the R-type $B_3$ where the edge exists. Since the unit pixel structure is the R-type, C is B and the seventh pixel of the R-type $B_7$ and the ninth pixel of the R-type $B_9$ exist in the center bottom CBottom. Accordingly, the representative value of B, i.e., B', of the fifth pixel of the R-type $G_5$ is corrected by using the seventh pixel of the R-type $B_7$ and the ninth pixel of the R-type $B_9$, i.e., an average value of the seventh pixel of the R-type $B_7$ and the ninth pixel of the R-type $B_9$, in case of the R-type where the edge is placed on the horizontal direction.

Meanwhile, in case of the B-type shown in Section (B) of FIG. 4C, the values of R and B are corrected by using the fourth pixel of the B-type $G_4$, the fifth pixel of the B-type $B_5$, the sixth pixel of the B-type $G_6$, the seventh bloc of the B-type $R_7$, the eight pixel of the B-type $G_8$ and the ninth pixel of the B-type $R_9$ except for the first pixel of the B-type $R_1$, the second pixel of the B-type $G_2$ and the third pixel of the B-type $R_3$ where the edge exists. Since the unit pixel structure is the B-type, C is R and the seventh pixel of the B-type $R_7$ and the ninth pixel of the B-type $R_9$ exist in the center bottom CBottom. Accordingly, the representative value of B, i.e., R', of the fifth pixel of the B-type $G_5$ is corrected by using the seventh pixel of the B-type $R_7$ and the ninth pixel of the B-type $R_9$, i.e., an average value of the seventh pixel of the B-type $R_7$ and the ninth pixel of the B-type $R_9$, in case of the B-type where the edge is placed on the horizontal direction.

Figure 5A:
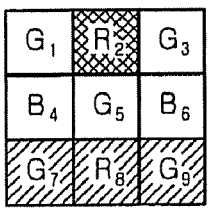
FIGS. 5A to 5C are diagrams illustrating corrections of R and B values in case of placing an edge under a horizontal line in accordance with the present invention.
Figure 5A:
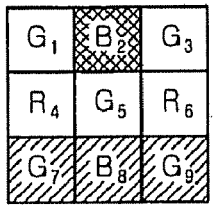
Figure 5B:
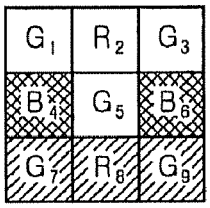
Figure 5B:
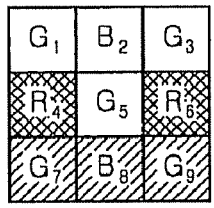
Figure 5C:
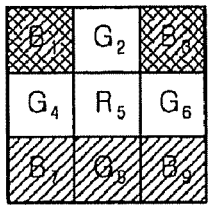
Figure 5C:
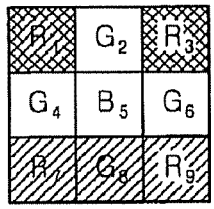

FIGS. 5A to 5C illustrate corrections of the values of R and B when the edge exists in the horizontal bottom.

Sections (A) and (B) of FIG. 5A illustrate the Gb-type and the Gr-type when the edge is placed in the horizontal bottom, respectively.

Herein, the formula denoting $C_1$atG=CTop is realized. As for the Gb-type as shown in Section (A) of FIG. 5A, the value of R and B are corrected by using the first pixel of the Gb-type $G_1$, the second pixel of the Gb-type $B_2$, the third pixel of the Gb-type $G_3$, the fourth pixel of the Gb-type $B_4$, the fifth pixel of the Gb-type $G_5$ and the sixth pixel of the Gb-type $B_6$ except for the seventh pixel of the Gb-type $G_7$, the eight pixel of the Gb-type $R_8$ and the ninth pixel of the Gb-type $G_9$ where the edge exists. Since the unit pixel structure is the Gb-type, $C_1$ is R and only the second pixel of the Gb-type $R_2$ exists in the center top CTop. Accordingly, the representative value of R, i.e., R', of the fifth pixel of the Gb-type $R_5$ can be replaced with only the second pixel of the Gb-type $R_2$ other than the eight pixel of the Gb-type $R_8$ in case of the Gb-type where the edge is placed in the horizontal bottom.

Meanwhile, in the Gr-type shown in Section (B) of FIG. 5A, the values of R and B are corrected by using the first pixel of the Gr-type $G_1$, the second pixel of the Gr-type $B_2$, the third pixel of the Gr-type $G_3$, the fourth pixel of the Gr-type $R_4$, the fifth pixel of the Gr-type $G_5$ and the sixth pixel of the Gr-type $R_6$ except for the seventh pixel of the Gr-type $G_7$, the eight pixel of the Gr-type $B_8$ and the ninth pixel of the Gr-type $G_9$ where the edge exists. Since the unit pixel structure is the Gr-type, $C_1$ is B and only the second pixel of the Gr-type $B_2$ exists in the center top CTop. Accordingly, the representative value of B, i.e., B', of the fifth pixel of the Gr-type $G_5$ can be replaced with only the second pixel of the Gr-type $B_2$ other than the eight pixel of the Gr-type $B_8$ in case of the Gr-type where the edge is placed in the horizontal bottom.

Sections (A) and (B) of FIG. 5B illustrate the Gb-type and the Gr-type when the edge is placed in the horizontal bottom.

Herein, the formula denoting $C_2$atG=CHorizontal is realized. The values of R and B are corrected by using the first pixel of the Gb-type $G_1$, the second pixel of the Gb-type $R_2$, the third pixel of the Gb-type $G_3$, the fourth pixel of the Gb-type $B_4$, the fifth pixel of the Gb-type $G_5$ and the sixth pixel of the Gb-type $B_6$ except for the seventh pixel of the Gb-type $G_7$, the eight pixel of the Gb-type $R_8$ and the ninth pixel of the Gb-type $G_9$ where the edge exists in case of the Gb-type as shown in Section (A) of FIG. 5B. Since the unit pixel structure is the Gb-type, $C_2$ is B and only the fourth pixel of the Gb-type $B_4$ and the sixth pixel of the Gb-type $B_6$ exist in the horizontal center CHorizontal. Accordingly, the representative value of B. i.e., B', of the fifth pixel of the Gb-type $G_5$ is corrected by using the fourth pixel of the Gb-type $B_4$ and the sixth pixel of the Gb-type $B_6$, i.e., an average value of the fourth pixel of the Gb-type $B_4$ and the sixth pixel of the Gb-type $B_6$, in case of the Gb-type where the edge exists in the horizontal top.

Meanwhile, as for the Gr-type as shown in Section (B) of FIG. 5B, the value of R and B are corrected by using the first pixel of the Gr-type $G_1$, the second pixel of the Gr-type $B_2$, the third pixel of the Gr-type $G_3$, the fourth pixel of the Gr-type $B_4$, the fifth pixel of the Gr-type $G_5$ and the sixth pixel of the Gr-type $B_6$ except for the seventh pixel of the Gr=type $G_7$, the eight pixel of the Gr-type $R_8$ and the ninth pixel of the Gr-type $G_9$ where the edge exists. Since the unit pixel structure is the Gr-type, $C_2$ is R and the fourth pixel of the Gr-type R4 and the sixth pixel of the Gr-type $R_6$ exists in the horizontal center CHorizontal. Accordingly, the representative value of R, i.e., R', of the fifth pixel of the Gr-type $G_5$ can be corrected by using the fourth pixel of the Gr-type $R_4$ and the sixth pixel of the Gr-type $R_6$, i.e., an average value of the fourth pixel of the Gr-type $R_4$ and the sixth pixel of the Gr-type $R_6$.

Sections (A) and (B) of FIG. 5C illustrate the R-type and the B-type when the edge is placed in the horizontal bottom, respectively.

Herein, the formula denoting CatRB=CTop is realized. As for the R-type shown in Section (A) of FIG. 5C, the values of R and B are corrected by using the first pixel of the R-type $B_1$, the second pixel of the R-type $G_2$, the third pixel of the R-type $B_3$, the fourth pixel of the R-type $G_4$, the fifth pixel of the R-type $R_5$ and the sixth pixel of the R-type $G_6$ except for the seventh pixel of the R-type $B_7$, the eight pixel of the R-type $G_8$ and the ninth pixel of the R-type $B_9$ where the edge exists. Since the unit pixel structure is the R-type, C is B and the first pixel of the R-type $B_1$ and the third pixel of the R-type $B_3$ exist in the center top CTop. Accordingly, the representative value of B, i.e., B', of the fifth pixel of the R-type $G_5$ can be corrected by using the first pixel of the R-type $B_1$ and the third pixel of the R-type $B_3$, i.e., an average value of the first pixel of the R-type $B_1$ and the third pixel of the R-type $B_3$, in case of the R-type of which the edge is on the horizontal direction.

Meanwhile, as for the B-type shown in Section (B) of FIG. 5C, the value of R and B are corrected by using the first pixel of the B-type $R_1$, the second pixel of the B-type $G_2$, the third pixel of the B-type $R_3$, the fourth pixel of the B-type $G_4$, the fifth pixel of the B-type $B_5$ and the sixth pixel of the B-type $G_6$ except for the seventh pixel of the B-type $R_7$, the eight pixel of the B-type $G_8$ and the ninth pixel of the B-type $R_9$ in which the edge exists. Since the unit pixel structure is the B-type, C is R and the first pixel of the B-type $R_1$ and the third pixel of the B-type $R_3$ exist in the center top CTop. Accordingly, the representative value of R, i.e., R', of the fifth pixel of the B-type $G_5$ can be obtained by using the first pixel of the B-type $R_1$ and the third pixel of the B-type $R_3$, i.e., an average value of the first pixel of the B-type $R_1$ and the third pixel of the B-type $R_3$, in case of the B-type of which the edge exists in the horizontal top.

Figure 6A:
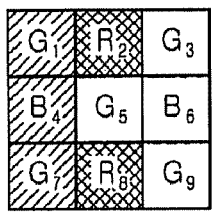
FIGS. 6A to 6C are diagrams illustrating corrections of R and B values in case of placing an edge on a left side of a vertical line in accordance with the present invention.
Figure 6A:
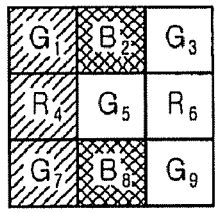
Figure 6B:
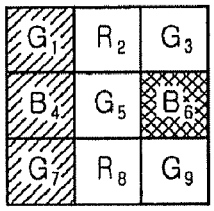
Figure 6B:
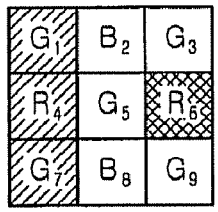
Figure 6C:
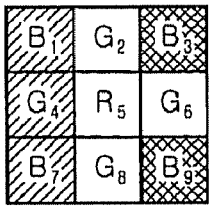
Figure 6C:
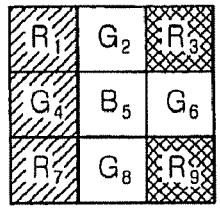

FIGS. 6A to 6C are diagrams illustrating corrections of the value of R and B when the edge is placed in the vertical left direction.

Sections (A) and (B) of FIG. 6A illustrate the Gb-type and the Gr-type when the edge is placed in the vertical left direction, respectively.

Herein, the formula denoting $C_1$atG=CVertical is realized. As for the Gb-type shown in Section (A) of FIG. 6A, the values of R and B are corrected by using the second pixel of the Gb-type $R_2$, the third pixel of the Gb-type $G_3$, the fifth pixel of the Gb-type $G_5$, the sixth pixel of the Gb-type $B_6$, the eight pixel of the Gb-type $R_8$ and the ninth pixel of the Gb-type $G_9$ except for the first pixel of the Gb-type $G_1$, the fourth pixel of the Gb-type $B_4$ and the seventh pixel of the Gb-type $G_7$ in which the edge exists. Since the unit pixel structure is the Gb-type, $C_1$ is R and the second pixel of the Gb-type $R_2$ and the eight pixel of the Gb-type $R_8$ exist in the vertical center CVertical. Accordingly, the representative value of R, i.e., R', of the fifth pixel of the Gb-type $G_5$ is obtained by using the second pixel of the Gb-type $R_2$ and the eight pixel of the Gb-type $R_8$, i.e., an average value of the second pixel of the Gb-type $R_2$ and the eight pixel of the Gb-type $R_8$, in case of the Gb-type of which the edge is placed in the vertical left direction.

Meanwhile, as for the Gr-type shown in Section (B) of FIG. 6A, the values of R and B are corrected by using the second pixel of the Gr-type $R_2$, the third pixel of the Gr-type $G_3$, the fifth pixel of the Gr-type $G_5$, the sixth pixel of the Gr-type the eight pixel of the Gr-type $R_8$ and the ninth pixel of the Gr-type $G_9$ except for the first pixel of the Gr-type $G_1$, the fourth pixel of the Gr-type $B_4$ and the seventh pixel of the Gr-type $G_7$ in which the edge exists. Since the unit pixel structure is the Gr-type, $C_1$ is B and the second pixel of the Gr-type $B_2$ and the eight pixel of the Gr-type $B_8$ exist in the vertical center CVertical. Accordingly, the representative value of B, i.e., B', of the fifth pixel of the Gr-type $G_5$ is obtained by using the second pixel of the Gr-type $B_2$ and the eight pixel of the Gr-type $B_8$, i.e., an average value of the second pixel of the Gr-type $B_2$ and the eight pixel of the Gr-type $B_8$, in case of the Gr-type of which the edge is placed in the vertical left direction.

Sections (A) and (B) of FIG. 6B illustrate the Gb-type and the Gr-type when the edge is placed in the vertical left direction, respectively.

Herein, the formula denoting $C_2$atG=CHorizontal is realized. As for the Gb-type shown in Section (A) of FIG. 6B, the values of R and B are corrected by using the second pixel of the Gb-type $R_2$, the third pixel of the Gb-type $G_3$, the fifth pixel of the Gb-type $G_5$, the sixth pixel of the Gb-type $B_6$, the eight pixel of the Gb-type $R_8$ and the ninth pixel of the Gb-type $G_9$ except for the first pixel of the Gb-type $G_1$, the fourth pixel of the Gb-type $B_4$ and the seventh pixel of the Gb-type $G_7$ in which the edge exists. Since the unit pixel structure is the Gb-type, $C_2$ is B and only the second pixel of the Gb-type $B_2$ exist in the horizontal center CHorizontal. Accordingly, the representative value of B, i.e., B', of the fifth pixel of the Gb-type $G_5$ is replaced by using only the six pixel of the Gb-type $G_6$ except for the fourth pixel of the Gb-type $B_4$, in case of the Gb-type in which the edge is placed in the vertical left direction.

Meanwhile, as for the Gr-type shown in Section (B) of FIG. 6B, the value of R and B are corrected by using the second pixel of the Gr-type $R_2$, the third pixel of the Gr-type $G_3$, the fifth pixel of the Gr-type $G_5$, the six pixel of the Gr-type $B_6$, the ninth pixel of the Gr-type $G_9$ except for the first pixel of the Gr-type $G_1$, the fourth pixel of the Gr-type $B_4$ and the seventh pixel of the Gr-type $G_7$ in which the edge exists. Since the unit pixel structure is the Gr-type, $C_2$ is R and only the sixth pixel of the Gr-type $R_6$ exists in the horizontal center CHorizontal. Accordingly, the representative value of R, i.e., R', of the fifth pixel of the Gr-type $G_5$ is replaced by using only the sixth pixel of the Gr-type $R_6$ except for the fourth pixel of the Gr-type $R_4$, in case of the Gr-type of which the edge is placed in the vertical left direction.

Sections (A) and (B) of FIG. 6C illustrate the R-type and the B-type when the edge is placed in the vertical left direction, respectively.

Herein, the formula denoting CatRB=CRight is realized. As for the R-type shown in Section (A) of FIG. 6C, the values of R and B are corrected by using the second pixel of the R-type $R_2$, the third pixel of the R-type $G_3$, the fifth pixel of the R-type $G_5$, the sixth pixel of the R-type $B_6$, the eight pixel of the R-type $R_8$ and the ninth pixel of the R-type $G_9$ except for the first pixel of the R-type $G_1$, the fourth pixel of the R-type $B_4$ and the seventh pixel of the R-type $G_7$ in which the edge exist. Since the unit pixel structure is the R-type, C is B and the third pixel of the R-type $B_3$ and the ninth pixel of the R-type $B_9$ exist in the center-right direction CRight. Accordingly, the representative value of B, i.e., B', of the fifth pixel of the R-type $G_5$ is corrected by using the third pixel of the R-type $B_3$ and the ninth pixel of the R-type $B_9$, i.e., an average value of the third pixel of the R-type $B_3$ and the ninth pixel of the R-type $B_9$, in case of the R-type of which the edge is placed in the vertical left direction.

Meanwhile, as for the B-type shown in Section (B) of FIG. 6C, the values of R and B are corrected by using the second pixel of the B-type $R_2$, the third pixel of the B-type $G_3$, the fifth pixel of the B-type $G_5$, the sixth pixel of the B-type $B_6$, the eight pixel of the B-type $R_8$ and the ninth pixel of the B-type $G_9$ except for the first pixel of the B-type $G_1$, the fourth pixel of the B-type $B_4$ and the seventh pixel of the B-type $G_7$ in which the edge exists. Since the unit pixel structure is the B-type, C is R and the third pixel of the B-type $R_3$ and the ninth pixel of the B-type $R_9$ exist in the center-right direction CRight. Accordingly, the representative value of R, i.e., R', of the fifth pixel of the B-type $G_5$ is corrected by using the third pixel of the B-type $R_3$ and the ninth pixel of the B-type $R_9$, i.e., an average value of the third pixel of the B-type $R_3$ and the ninth pixel of the B-type $R_9$, in case of the B-type of which the edge is placed in the vertical left direction.

Figure 7A:
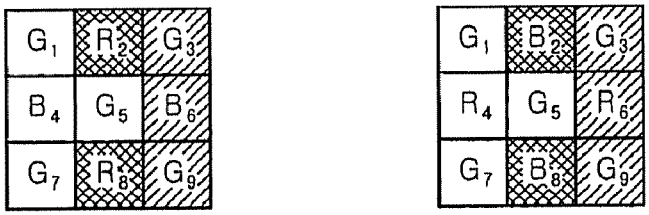
FIGS. 7A to 7C are diagrams illustrating corrections of R and B values in case of placing an edge on a right side of a vertical line in accordance with the present invention.
Figure 7B:
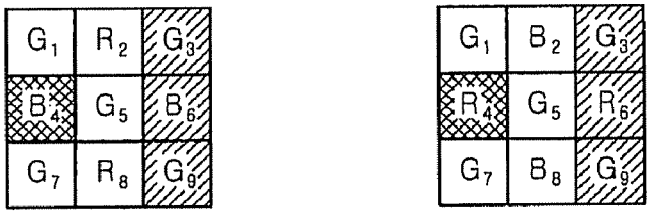
Figure 7C:
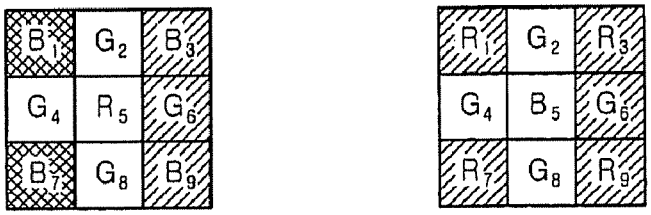

FIGS. 7A to 7C are diagrams illustrating corrections of the values of R and B when the edge is placed in the vertical right direction.

Sections (A) and (B) of FIG. 7A illustrate the Gb-type and the Gr-type when the edge is placed in the vertical right direction, respectively.

Herein, the formula denoting $C_1$atG=CVertical is realized. As for the Gb-type shown in Section (A) of FIG. 7A, the values of R and B are corrected by using the first pixel of the Gb-type $G_1$, the second pixel of the Gb-type $R_2$, the fourth pixel of the Gb-type $B_4$, the fifth pixel of the Gb-type $G_5$, the seventh pixel of the Gb-type $G_7$ and the eight pixel of the Gb-type $R_8$ except for the third pixel of the Gb-type $G_3$, the sixth pixel of the Gb-type $B_6$ and the ninth pixel of the Gb-type $G_9$ in which the edge exists. Since the unit pixel structure is the Gb-type, $C_1$ is R and the second pixel of the Gb-type $R_2$ and the eight pixel of the Gb-type $R_8$ exist in the vertical center CVertical. Accordingly, the representative value of R, i.e., R', of the fifth pixel of the Gb-type $G_5$ is corrected by using the second pixel of the Gb-type $R_2$ and the eight pixel of the Gb-type $R_8$, i.e., an average value of the second pixel of the Gb-type $R_2$ and the eight pixel of the Gb-type $R_8$, in case of the Gb-type in which the edge is placed in the vertical right direction.

Meanwhile, as for the Gr-type shown in Section (B) of FIG. 7A, the values of R and B are corrected by using the first pixel of the Gr-type $G_1$, the second pixel of the Gr-type $R_2$, the fourth pixel of the Gr-type $B_4$, the fifth pixel of the Gr-type $G_5$, the seventh pixel of the Gr-type $G_7$ and the eight pixel of the Gr-type $R_8$ except for the third pixel of the Gr-type $G_3$, the sixth pixel of the Gr-type $B_6$ and the ninth pixel of the Gr-type $G_9$ in which the edge exists. Since the unit pixel structure is the Gr-type, $C_1$ is B and the second pixel of the Gr-type $B_2$ and the eight pixel of the Gr-type $B_8$ exist in the vertical center CVertical. Accordingly, the representative value of B, i.e., B', of the fifth pixel of the Gr-type $G_5$ is replaced by using the second pixel of the Gr-type $B_2$ and the eight pixel of the Gr-type $B_8$, i.e., an average of the second pixel of the Gr-type $B_2$ and the eight pixel of the Gr-type $B_8$, in case of the Gr-type of which the edge is placed in the vertical right direction.

Sections (A) and (B) of FIG. 7B illustrate the Gb-type and the Gr-type when the edge is placed in the vertical right direction, respectively.

Herein, the formula $C_2$atG=$C_1$eft is realized. As for the Gb-type shown in Section (A) of FIG. 7B, the values of R and B are corrected by using the first pixel of the Gb-type $G_1$, the second pixel of the Gb-type $R_2$, the fourth pixel of the Gb-type $B_4$, the fifth pixel of the Gb-type $G_5$, the seventh pixel of the Gb-type $G_7$ and the eight pixel of the Gb-type $R_8$ except for the third pixel of the Gb-type $G_3$, the sixth pixel of the Gb-type $B_6$ and the ninth pixel of the Gb-type $G_9$ in which the edge exists. Since the unit pixel structure is the Gb-type, $C_2$ is B and only the fourth pixel of the Gb-type $B_4$ exists in the center left direction Cleft. Accordingly, the representative value of B, i.e., B', of the fifth pixel of the Gb-type $G_5$ is replaced by using only the fourth pixel of the Gb-type $B_4$ except for the sixth pixel of the Gb-type $B_6$, in case of the Gb-type of which the edge is placed in the vertical right direction.

Meanwhile, as for the Gr-type shown in Section (B) of FIG. 7B, the values of R and B are corrected by using the first pixel of the Gr-type $G_1$, the second pixel of the Gr-type $R_2$, the fourth pixel of the Gr-type $B_4$, the fifth pixel of the Gr-type $G_5$, the seventh pixel of the Gr-type $G_7$ and the eight pixel of the Gr-type $R_8$ except for the third pixel of the Gr-type $G_3$, the sixth pixel of the Gr-type $B_6$ and the ninth pixel of the Gr-type $G_9$ in which the edge exists. Since the unit pixel structure is the Gr-type, $C_2$ is R and only the fourth pixel of the Gr-type $R_4$ exists in the center left direction Cleft. Accordingly, the representative value of R, i.e., R', of the fifth pixel of the Gr-type $G_5$ is replaced by using only the fourth pixel of the Gr-type $R_4$ except for the sixth pixel of the Gr-type $R_6$, in case of the Gr-type of which the edge is placed in the vertical right direction.

Sections (A) and (B) of FIG. 7C illustrate the R-type and the B-type when the edge is placed in the vertical right direction, respectively.

Herein, the formula denoting CatRB=Cleft is realized. As for the R-type shown in Section (A) of FIG. 7C, the values of R and B are corrected by using the first pixel of the R-type $G_1$, the second pixel of the R-type $R_2$, the fourth pixel of the R-type $B_4$, the fifth pixel of the R-type $G_5$, the seventh pixel of the R-type $G_7$ and the eight pixel of the R-type $R_8$ except for the third pixel of the R-type $G_3$, the sixth pixel of the R-type $B_6$ and the ninth pixel of the R-type $G_9$ in which the edge exists. Since the unit pixel structure is the R-type, C is B and the first pixel of the R-type $B_1$ and the seventh pixel of the R-type $B_7$ exist in the center left direction Cleft. Accordingly, the representative value of B, i.e., B', of the fifth pixel of the R-type $G_5$ is corrected by using the first pixel of the R-type $B_1$ and the seventh pixel of the R-type $B_7$, i.e., an average value of the first pixel of the R-type $B_1$ and the Seventh pixel of the R-type $B_7$, in case of the R-type of which the edge is placed in the vertical right direction.

Meanwhile, as for the B-type shown in Section (B) of FIG. 7C, the values of R and B are corrected by using the first pixel of the B-type $G_1$, the second pixel of the B-type $R_2$, the fourth pixel of the B-type $B_4$, the fifth pixel of the B-type $G_5$, the seventh pixel of the B-type $G_7$ and the eight pixel of the B-type $R_8$ except for the third pixel of the B-type $G_3$, the sixth pixel of the B-type $B_6$ and the ninth pixel of the B-type $G_9$ in which the edge exists. Since the unit pixel structure is the B-type, C is R and the first pixel of the B-type $R_1$ and the seventh pixel of the B-type $R_7$ exist in the center left direction Cleft. Accordingly, the representative value of R, i.e., R', of the fifth pixel of the B-type $G_5$ is corrected by using the first pixel of the B-type $R_1$ and the seventh pixel of the B-type $R_7$, i.e., an average value of the first pixel of the B-type $R_1$ and the seventh pixel of the B-type $R_7$, in case of the B-type of which the edge is placed in the vertical right direction.

As described above, the color interpolation method in accordance with the present invention corrects the values of R, B and G according to each pattern of the unit pixel structure of 3×3 and lowers color tones according to the values of R, G and B and emphasizes a brightness to emphasize the edge and prevents the incorrect colors in case of that the edge is placed in the horizontal center direction or the vertical center direction.

Figure 8:
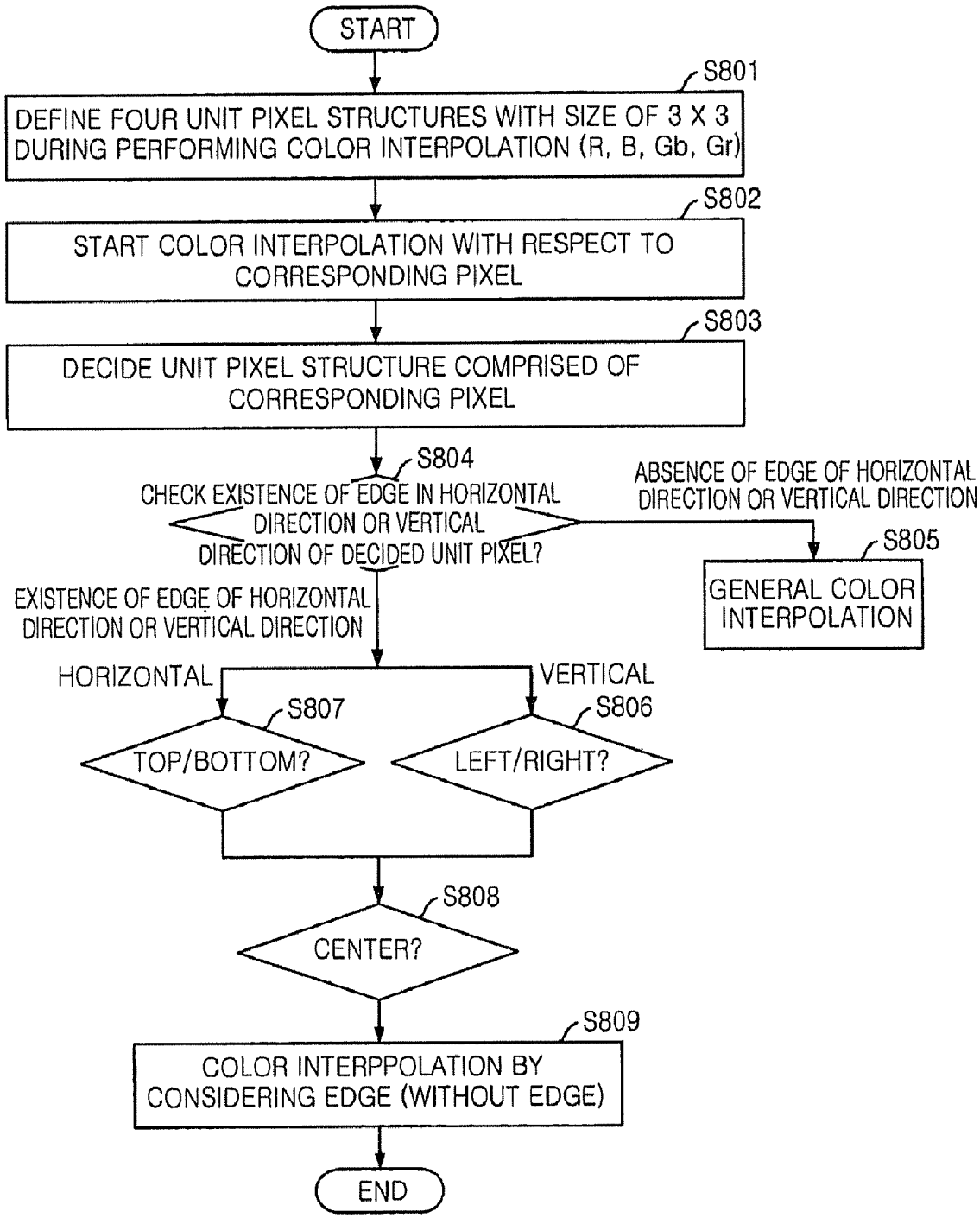
FIG. 8 is a flowchart schematizing a color interpolation method by considering edges in accordance with the present invention.
Figure 9:
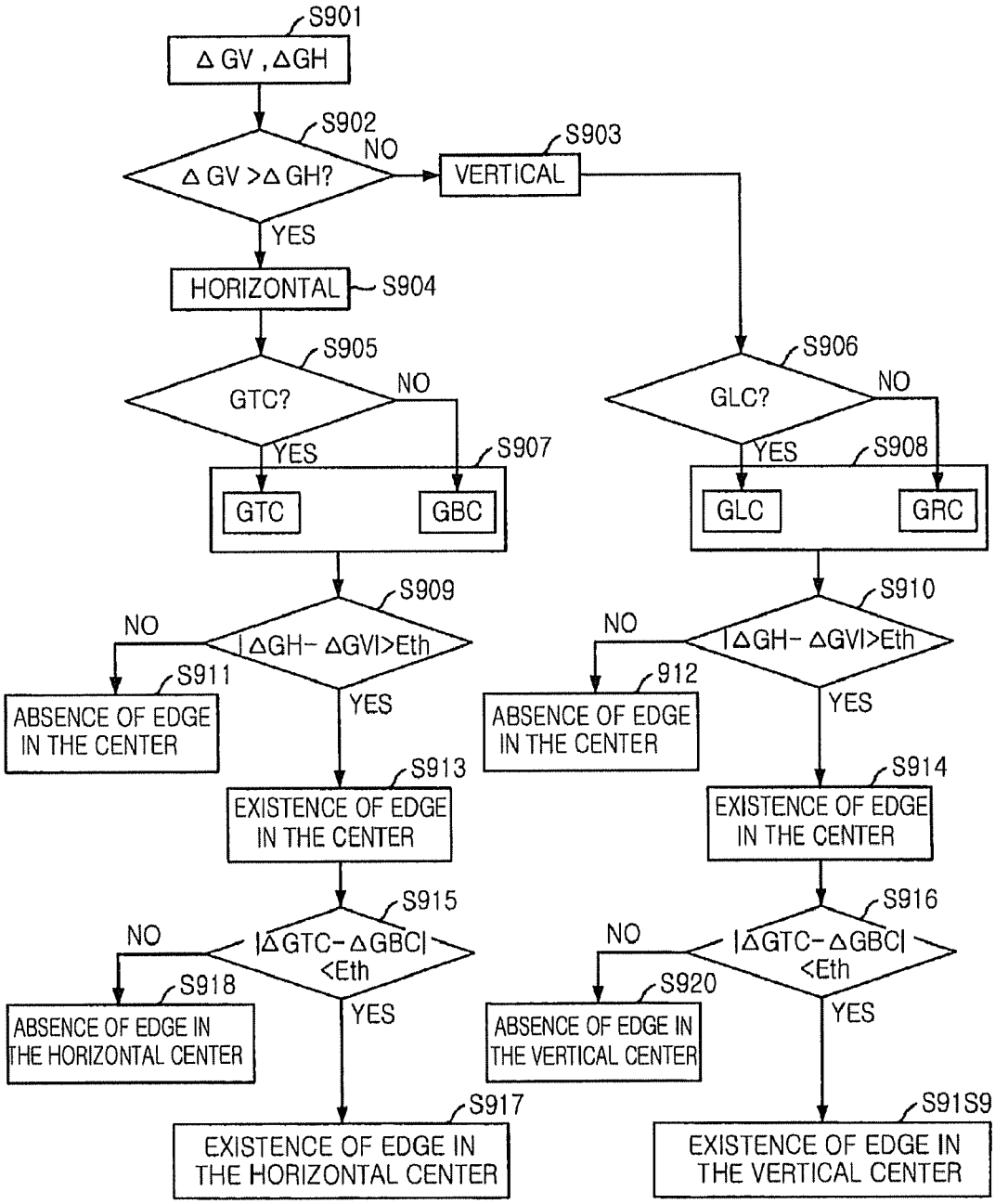
FIG. 9 is a flowchart schematizing a method for obtaining edges in accordance with the present invention.
Figure 1A:
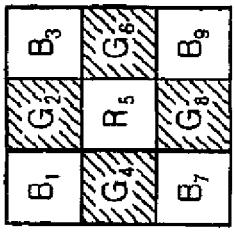
Figure 1B:
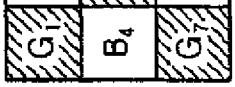
Figure 1C:
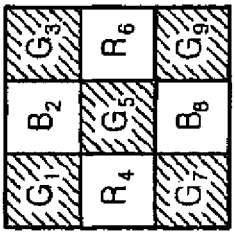
Figure 1D:
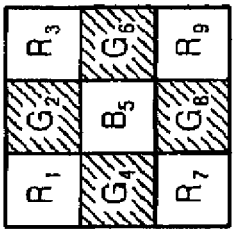
Figure 1E:
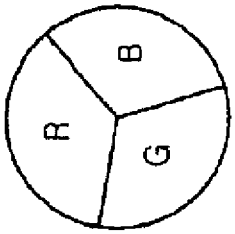
Figure 5A:
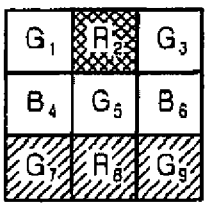
Figure 5A:
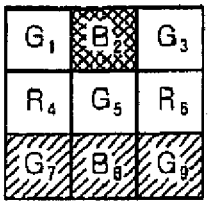
Figure 5B:
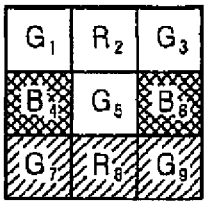
Figure 5B:
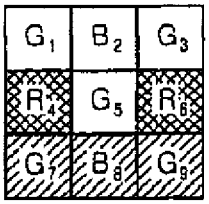
Figure 5C:
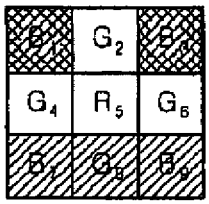
Figure 5C:
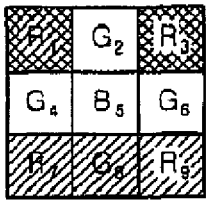

FIG. 8 is a flowchart schematizing a color interpolation method by considering an edge in accordance with the present invention. FIG. 9 is a flowchart schematizing a method for obtaining an edge in accordance with the present invention. With references to FIGS. 8 and 9, discrimination in the edge and the color interpolation method will be examined.

First, four R-type, B-type, Gb-type and Gr-type unit pixel structures with a size of 3×3 surrounded by eight pixels as shown in FIG. 1 are defined at step S801.

As shown in FIG. 1A, the R-type unit pixel structure is comprised of nine pixels of a first pixel of the R-type $B_1$, a second pixel of the R-type $G_2$, a third pixel of the R-type $B_3$, a fourth pixel of the R-type $G_4$, a fifth pixel of the R-type $R_5$, a sixth pixel of the R-type $G_6$, a seventh pixel of the R-type $B_7$, an eight pixel of the R-type $G_8$ and a ninth pixel of the R-type $B_9$. The R pixel in the center, i.e., the fifth pixel of the R-type $R_5$, is surrounded by the four G pixels, i.e., the second pixel of the R-type $G_2$, the fourth pixel of the R-type $G_4$, the sixth pixel of the R-type $G_6$ and the eight pixel of the type $G_8$ and the four B pixels, in the top, the bottom, the left and the right and the four B pixels, i.e., the first pixel of the R-type $B_1$, the third pixel of the R-type $B_3$, the seventh pixel of the R-type $B_7$ and the ninth pixel of the R-type $B_9$, in the corners of the structure in diagonal directions.

As shown in FIG. 1B, the Gb-type unit pixel structure is comprised of nine pixels, i.e., a first pixel of the Gb-type $G_1$, a second pixel of the Gb-type $R_2$, a third pixel of the Gb-type $G_3$, a fourth pixel of the Gb-type $B_4$, a fifth pixel of the Gb-type $G_5$, a sixth pixel of the Gb-type $B_6$, a seventh pixel of the Gb-type $G_7$, an eight pixel of the Gb-type $R_8$ and a ninth pixel of the Gb-type $G_9$. The G pixel in the center, i.e., the fifth pixel of the Gb-type $G_5$, is surrounded by the four G pixels, i.e., the first pixel of the Gb-type $G_1$, the third pixel of the Gb-type $G_3$, the seventh pixel of the Gb-type $G_7$ and the ninth pixel of the Gb-type $G_9$, in the top, the bottom, the left and the right, the two R pixels, i.e., the second pixel of the Gb-type $R_2$ and the eight pixel of the Gb-type $R_8$ in the top and the bottom and the two B pixels, i.e., the fourth pixel of the Gb-type $B_4$ and the sixth pixel of the Gb-type $G_6$, in the left and the right.

As shown in FIG. 1C, the Gr-type unit pixel structure is comprised of nine pixels, i.e., a first pixel of the Gr-type $G_1$, a second pixel of the Gr-type $B_2$, a third pixel of the Gr-type $G_3$, a fourth pixel of the Gr-type $R_4$, a fifth pixel of the Gr-type $G_5$, a sixth pixel of the Gr-type $R_6$, a seventh pixel of the Gr-type $G_7$, an eight pixel of the Gr-type $B_8$ and a ninth pixel of the Gr-type $G_9$. The G pixel in the center, i.e., the fifth pixel of the Gr-type $G_5$, is surrounded by the four G pixels, i.e., the first pixel of the Gr-type $G_1$, the third pixel of the Gr-type $G_3$, the seventh pixel of the Gr-type $G_7$ and the ninth pixel of the Gr-type $G_9$, in the corners of the structure in diagonal directions, the two B pixels, i.e., the second pixel of the Gr-type $B_2$ and the eight pixel of the Gr-type $B_8$, in the left and the right and the two R pixels, i.e., the fourth pixel of the Gr-type $R_4$ and the sixth pixel of the Gr-type $R_6$, in the left and the right.

As shown in FIG. 1D, the B-type unit pixel structure is comprised of nine pixels, i.e., a first pixel of the B-type $R_1$, a second pixel of the B-type $G_2$, a third pixel of the B-type $R_3$, a fourth pixel of the B-type $G_4$, a fifth pixel of the B-type $B_5$, a sixth pixel of the B-type $G_6$, a seventh pixel of the B-type $R_7$, an eight pixel of the B-type $G_8$ and a ninth pixel of the B-type $R_9$. The B pixel in the center, i.e., the fifth pixel of the B-type $B_5$, is surrounded by the four G pixels, i.e., the second pixel of the B-type $G_2$, the fourth pixel of the B-type $G_4$, the sixth pixel of the B-type $G_6$ and the eight pixel of the B-type $G_8$, in the top, the bottom, the left and the right and the four R pixels, i.e., the first pixel of the B-type $R_1$, the third pixel of the B-type $R_3$, the seventh pixel of the B-type $R_7$ and the ninth pixel of the B-type $R_9$, in the corners of the structure in diagonal directions.

Subsequently, in the defined four unit pixel structures with the size of 3×3, each representative value of R, G and B, i.e., R', G' and B', is defined. At this time, each of the representative values of R, G and B, i.e., R', G' and B', of the four unit pixel structures is same as the mathematics formulae 1 to 4 listed above.

If the four unit pixel structures and the representative values of R, G and B, i.e., R', G' and B', of the four unit pixel structures are determined, a color interpolation is employed at step S802.

Meanwhile, in accordance with the present invention, the edges are precisely found and the color interpolation is performed in various methods according to the edges. That is, a unit pixel structure corresponding to a pixel subjected to the color interpolation is selected by understanding that a structure provided with the surrounding eight pixels and the corresponding pixel is belonged to which unit pixel structure among the four unit pixel structures at step S803. Herein, the four unit pixel structures with the size of 3×3 include a mode type of a pixel pattern comprised of R, G and B.

Subsequently, an existence of the edge of either a horizontal direction or a vertical direction of the selected unit pixel structures is checked, thereby judging whether the edge of the corresponding unit pixel structure is placed in the horizontal direction or the vertical direction at step S804. If there is not the edge of the horizontal direction or the vertical direction, a general color interpolation is performed at step S805.

A judgment of the existence of the edge in either the horizontal direction or the vertical direction can be performed by comparing a changed amount of the G value in the horizontal direction, i.e., ΔGH, with a changed amount of the G value in the vertical direction, i.e., ΔGV, thereby deciding whether the edge is placed in the horizontal direction or the vertical direction.

That is, as shown in FIG. 9, the changed amount of the G value in the horizontal direction, i.e., ΔGH, and the changed amount of the G value in the vertical direction, i.e., ΔGV, are first calculated at step S901. ΔGH and ΔGV can be obtained as described above.

ΔGH and ΔGV are compared with each other at step S902. As a result of the comparison, as ΔGV is greater than ΔGH, the edge is judged to be placed in the horizontal direction at step S904 and as ΔGH is greater than ΔGV, the edge is judged to be placed in the vertical direction at step S903.

Next, as shown in FIG. 8, the existence of the edges of a vertical left direction or a vertical right direction is decided as the corresponding unit pixel structure has the edge placed in the vertical direction at step S806. Also, the existence of the edges of a horizontal top direction or a horizontal bottom direction is decided as the corresponding unit pixel structure has the edge placed in the horizontal direction at step S807.

Subsequently, as the edge of the horizontal top direction or the horizontal bottom direction and the edge of the vertical left direction or the vertical right direction are decided, the existence of the edge in the center is judged at step S808.

Next, according to all of the judged edges, the color interpolation is performed by using the surrounding pixels except for the pixels that the edge is placed at step S809. At this time, the color interpolation is performed in a method for making each of the values of R, G and B identically, thereby lowering the color tones and emphasizing the brightness according to the existence of the edge in the center.

Steps S806 to S808 will be examined in more details through FIG. 9.

As the edge of the horizontal direction exists at step S904, the existence of the edge of the horizontal top or the horizontal bottom is decided at step S905. At this time, the changed amount of the top-center direction, i.e., ΔGTC, calculated by subtracting the representative value of G, i.e., G', from the G value of an upper portion of the corresponding unit pixel structure and the changed amount of the bottom-center direction, i.e., ΔGBC, calculated by subtracting the representative value of G, i.e., G', from the G value of a lower portion of the corresponding unit pixel structure are compared with each other. As a result, as ΔGTC is greater than ΔGBC, the unit pixel structure has the edge of the horizontal direction and as ΔGBC is greater than ΔGTC, the unit pixel structure has the edge of the vertical direction at step S907.

As the edge of the vertical direction exists at step S903, the existence of the edge of the vertical left direction or the vertical right direction is decided at step S906. At this time, the changed amount of the left-center direction, i.e., ΔGLC, calculated by subtracting the representative value of G, i.e., G', from the G value of a left portion of the corresponding unit pixel structure and the changed amount of the right-center direction, i.e., ΔGRC, calculated by subtracting the representative value of G, i.e., G', from the G value of a right portion of the corresponding unit pixel structure are compared with each other. As a result, as ΔGLC is greater than ΔGRC, the unit pixel structure has the edge of the vertical left direction and as ΔGRC is greater than ΔGLC, the unit pixel structure has the edge of the vertical right direction at step S908.

The step of judging the existence of the edge in the center is performed by comparing a difference between ΔGH and ΔGV and the edge threshold value, i.e., Eth. This step is performed in the horizontal direction and the vertical direction, respectively at steps S909 and S910.

At this time, the difference between ΔGH and ΔGV, i.e., |ΔGH−ΔGV|, is greater than Eth, the edge is placed in the center at steps S913 and S914. If the difference between ΔGH and ΔGV, i.e., |ΔGH−ΔGV|, is less than Eth, the edge is not placed in the center at steps S911 and S912.

If the difference between the changed amount of the vertical direction, i.e., ΔGV, and the changed amount of the horizontal direction, i.e., ΔGH, is greater than Eth, the edge is placed in the center at step S913. At this time, the difference between the changed amount of the top-center direction, i.e., ΔGTC, and the changed amount of the bottom-center direction, i.e., ΔGBC is compared with the edge threshold value, i.e., Eth at step S915. At this time, if |ΔGTC−ΔGBC| is less than Eth, the edge is placed in the center direction at step S917. If |ΔGTC−ΔGBC| is greater than Eth, the edge is not placed in the horizontal center direction at step S918

If the difference between the changed amount of the vertical direction, i.e., ΔGV, and the changed amount of the horizontal direction, i.e., ΔGH, is greater than Eth, the edge is placed in the center at step S914. At this time, the difference between the changed amount of the left-center direction, i.e., ΔGLC, and the changed amount of the right-center direction, i.e., ΔGRC, is compared with the edge threshold value, i.e., Eth, at step S916. At this time, if |ΔGLC−ΔGRC| is less than Eth, the edge is placed in the center at step S919. If |ΔGLC−ΔGRC| is greater than Eth, the edge is not placed in the vertical center direction at step S920.

Meanwhile, the color interpolation subjected to the four unit pixel structures by considering the edges can be expressed with a mathematics formula 9 as follows.

[Mathematics Formula 9]

$$R' = \begin{cases} \text{CenterG, Center_Edge = True} \\ \text{CenterG, Center_Edge = False, RType} \\ \text{C1atG, Center_Edge = False, GbType} \\ \text{C2atG, Center_Edge = False, Grype} \\ \text{CatRB, Center_Edge = False, BType} \end{cases}$$

$$G' = \begin{cases} \text{CenterG, Center_Edge = True} \\ \text{MissG, Center_Edge = False, RType} \\ \text{CenterG, Center_Edge = False, GbType} \\ \text{CenterG, Center_Edge = False, Grype} \\ \text{MissG, Center_Edge = False, BType} \end{cases}$$

$$B' = \begin{cases} \text{CenterG, Center_Edge = True} \\ \text{CatRB, Center_Edge = False, RType} \\ \text{C2atG, Center_Edge = False, GbType} \\ \text{C1atG, Center_Edge = False, Grype} \\ \text{CenterC, Center_Edge = False, BType} \end{cases}$$

That is, regardless of the four types of the unit pixel structures, if the edge is placed in the center as denoted with Center_Edge=True, the color interpolation is performed by using the G pixel in the center, i.e., CenterG, having a strong brightness in the representative values of R, G and B, i.e., R', G' and B'. Through the steps described above in accordance with each different type, the representative values of R, G and B, i.e., R', G', and B', are determined according to the existence of the edge in the center as shown in Mathematics Formula 9, thereby performing the color interpolation.

The present invention decides a precise position of an edge with use of a G value in a unit pixel structure with a size of 3×3, thereby using different color interpolations according to the position of the edge. Also, the present invention provides an effect of emphasizing an edge by emphasizing a brightness and lowering colors when the edge is placed in the vertical center direction or the horizontal center direction of the unit pixel structure of 3×3 with use of a property that the edge has stronger brightness than the colors and prevents an incorrect color.

The present invention provides effects of emphasizing an edge and preventing incorrect colors by performing different color interpolation methods according to positions of the edge.

The present application contains subject matter related to the Korean patent application No. KR 2004-0027520, filed in the Korean Patent Office on Apr. 21, 2004 the entire contents of which being incorporated herein by reference.

While the present invention has been described with respect to certain preferred embodiments, it will be apparent to those skilled in the art that various changes and modifications may be made without departing from the spirit and scope of the invention as defined in the following claims.

What is claimed is:

1. A color interpolation method, comprising the steps of:

obtaining a color image using a semiconductor device, the color image comprising unit pixel structures;

defining four R-type, B-type, Gb-type and Gr-type unit pixel structures with a size of 3×3 comprised of one pixel subjected to the color interpolation and eight pixels surrounding the pixel subjected to the color interpolation, wherein the R-type unit pixel structure includes a first pixel of the R-type $B_1$, a second pixel of the R-type $G_2$, a third pixel of the R-type $B_3$, a fourth pixel of the R-type $G_4$, a fifth pixel of the R-type $R_5$, a sixth pixel of the R-type $G_6$, a seventh pixel of the R-type $B_7$, an eight pixel of the R-type $G_8$ and a ninth pixel of the R-type $B_9$, the Gb-type unit pixel is comprised of a first pixel of the Gb-type $G_1$, a second pixel of the Gb-type $R_2$, a third pixel of the Gb-type $G_3$, a fourth pixel of the Gb-type $B_4$, a fifth pixel of the Gb-type $G_5$, a sixth pixel of the Gb-type $B_6$, a seventh pixel of the Gb-type $G_7$, an eight pixel of the Gb-type $R_8$ and a ninth pixel of the Gb-type $G_9$, the Gr-type is comprised of a first pixel of the Gr-type $G_1$, a second pixel of the Gr-type $B_2$, a third pixel of the Gr-type $G_3$, a fourth pixel of the Gr-type $R_4$, a fifth pixel of the Gr-type $G_5$, a sixth pixel of the Gr-type $R_6$, a seventh pixel of the Gr-type $G_7$, an eight pixel of the Gr-type $B_8$ and a ninth pixel of the $G_9$ and the B-type is comprised of a first pixel of the B-type $R_1$, a second pixel of the B-type $G_2$, a third pixel of the B-type $R_3$, a fourth pixel of the B-type $G_4$, a fifth pixel of the B-type $B_5$, a sixth pixel of the B-type $G_6$, a seventh pixel of the B-type $R_7$, an eight pixel of the B-type $G_8$ and a ninth pixel of the B-type $R_9$;

defining R', G' and B' that are representative values of R, G and B at the four unit pixel structures with the size of 3×3;

deciding one of the four unit pixel structures with the size of 3×3 that the corresponding pixel is falling under for performing the color interpolation with respect to the corresponding pixel;

judging whether an edge exists in one of a horizontal direction and a vertical direction at the unit pixel structure as the unit pixel structure is decided;

judging whether the edge exists in one of a horizontal top direction and a horizontal bottom direction as the corresponding unit pixel structure has the horizontal edge and judging whether the edge exists in one of a vertical left direction and a vertical right direction as the corresponding unit pixel structure has the vertical direction;

judging whether the edge exists in the center as the edge existing one of the horizontal top direction and the horizontal bottom direction and the edge existing one of the vertical left direction and the vertical right direction are checked; and performing the color interpolation according to all the discriminated edges by using the surrounding pixels except for the pixels where the edge exists, wherein the color interpolation is performed by making the values of R, G and B identically as the edge exists in the center, thereby lowering a color and emphasizing a brightness, wherein the step of judging the existence of the edge of one of the horizontal top direction and the horizontal bottom direction is performed by comparing a changed amount of a top-center direction denoted with ΔGTC that is obtained by subtracting the representative green value from the green value in an upper portion of the corresponding pixel structure with the changed amount of a bottom-center direction that is denoted with ΔGBC obtained by subtracting the representative green value from the green value in a lower portion of the corresponding pixel structure, thereby concluding that the unit pixel structure has the edge of the horizontal-top direction as ΔGTC is greater than ΔGBC and concluding that the unit pixel structure has the edge of the horizontal-bottom direction as ΔGBC is greater than ΔGTC.

2. The method of claim 1, wherein the step of judging the existence of the edge of one of the horizontal direction and the vertical direction is performed by comparing a changed amount of the green value of the horizontal direction denoted with ΔGH, with the changed amount of the green value of the vertical direction denoted with ΔGV.

3. The method of claim 2, wherein as ΔGH is greater than ΔGV, the edge is judged as the edge of the vertical direction and as ΔGV is greater than ΔGH, the edge is judged as the edge of the horizontal direction.

4. The method of claim 1, wherein the step of judging the existence of the edge of one of the vertical left direction and the vertical right direction is performed by comparing a changed amount of a left-center direction denoted with ΔGLC that is obtained by subtracting the representative green value from the green value in a right portion of the corresponding pixel structure with the changed amount of a right-center direction denoted with ΔGRC that is obtained by subtracting the representative green value from the green value in a left portion of the corresponding pixel structure, thereby concluding that the unit pixel structure has the edge of the vertical left direction as ΔGLC is greater than ΔGRC and concluding that the unit pixel structure has the edge of the vertical right direction as ΔGRC is greater than ΔGLC.

5. The method of claim 4, wherein the step of judging the existence of the edge in the center concludes that the edge exits in the center as a difference between ΔGH and ΔGV is greater than a threshold value of a first edge.

6. The method of claim 5, wherein the edge exists in the center as a difference between ΔGTC and ΔGBC is less than a second edge.

7. The method of claim 5, wherein the edge exists in the center as a difference between ΔGLC and ΔGRC is less than a second edge.

8. The method of claim 1, wherein the step of judging the existence of the edge in the center concludes that the edge exits in the center as a difference between ΔGH and ΔGV is greater than a threshold value of a first edge.

9. The method of claim 8, wherein the edge exists in the center as a difference between ΔGTC and ΔGBC is less than a second edge.

10. The method of claim 8, wherein the edge exists in the center as a difference between ΔGLC and ΔGRC is less than a second edge.

*11. A color interpolation method, comprising:*

*obtaining a color image using a semiconductor device, the color image comprising a plurality of unit pixel structures; and*

*determining whether an edge exists in one of a horizontal top direction and a horizontal bottom direction and determining whether the edge exists in one of a vertical left direction and a vertical right direction;*

*wherein the step of determining the existence of the edge of one of the horizontal top direction and the horizontal bottom direction is performed by comparing a changed amount of a top-center direction denoted with ΔGTC that is obtained by subtracting a representative green value from a green value in an upper portion of a corresponding pixel structure with the changed amount of a bottom center direction that is denoted with ΔGBC obtained by subtracting the representative green value from a green value in a lower portion of the corresponding pixel structure, thereby concluding that the unit pixel structure has the edge of the horizontal top direction if ΔGTC is greater than ΔGBC and concluding that the unit pixel structure has the edge of the horizontal bottom direction as ΔGBC as if greater than ΔGTC.*

*12. The method of claim 11, further comprising determining whether an edge exists in one of a horizontal direction and a vertical direction at the corresponding unit pixel structure as the corresponding unit pixel structure is decided.*

*13. The method of claim 12, wherein the determining the existence of the edge of one of the horizontal direction and the*

*vertical direction is performed by comparing a changed amount of the green value of the horizontal direction denoted with ΔGH, with the changed amount of the green value of the vertical direction denoted with ΔGV.*

*14. The method of claim 13, wherein if ΔGH is greater than ΔGV, the edge is determined as the edge of the vertical direction and if ΔGV is greater than ΔGH, the edge is determined as the edge of the horizontal direction.*

*15. The method of claim 11, wherein the determining the existence of the edge of one of the vertical left direction and the vertical right direction is performed by comparing a changed amount of a left center direction denoted with ΔGLC that is obtained by subtracting the representative green value from the green value in a right portion of the corresponding pixel structure with the changed amount of a right center direction denoted with ΔGRC that is obtained by subtracting the representative green value from the green value in a left portion of the corresponding pixel structure, thereby concluding that the corresponding unit pixel structure has the edge of the vertical left direction as ΔGLC is greater than ΔGRC and concluding that the corresponding unit pixel structure has the edge of the vertical right direction as ΔGRC is greater than ΔGLC.*

*16. The method of claim 15, further comprising determining whether the edge exists in the center as the edge existing in one of the horizontal top direction and the horizontal bottom direction and the edge existing in one of the vertical left direction and the vertical right direction are checked.*

*17. The method of claim 16, wherein the determining the existence of the edge in the center concludes that the edge exists in the center if a difference between ΔGH and ΔGV is greater than a threshold value of a first edge.*

*18. The method of claim 16, wherein the edge exists in the center if a difference between ΔGTC and ΔGBC is less than a second edge.*

*19. The method of claim 16, wherein the edge exists in the center if a difference between ΔGLC and ΔGRC is less than a second edge.*

*20. The method of claim 11, further comprising defining four R-type, B-type, Gb-type and Gr-type unit pixel structures with a size of 3×3 comprised of one pixel subjected to the color interpolation and eight pixels surrounding the pixel subjected to the color interpolation, wherein the R-type unit pixel structure includes a first pixel of the R-type $B_1$, a second pixel of the R-type $G_2$, a third pixel of the R-type $B_3$, a fourth pixel of the R-type $G_4$, a fifth pixel of the R-type $R_5$, a sixth pixel of the R-type $G_6$, a seventh pixel of the R-type $B_7$, an eight pixel of the R-type $G_8$ and a ninth pixel of the R-type $B_9$, the Gb-type unit pixel is comprised of a first pixel of the Gb-type $G_1$, a second pixel of the Gb-type $R_2$, a third pixel of the Gb-type $G_3$, a fourth pixel of the Gb-type $B_4$, a fifth pixel of the Gb-type $G_5$, a sixth pixel of the Gb-type $B_6$, a seventh pixel of the Gb-type $G_7$, an eight pixel of the Gb-type $R_8$ and a ninth pixel of the Gb-type $G_9$, the Gr-type is comprised of a first pixel of the Gr-type $G_1$, a second pixel of the Gr-type $B_2$, a third pixel of the Gr-type $G_3$, a fourth pixel of the Gr-type $R_4$, a fifth pixel of the Gr-type $G_5$, a sixth pixel of the Gr-type $R_6$, a seventh pixel of the Gr-type $G_7$, an eight pixel of the Gr-type $B_8$ and a ninth pixel of the $G_9$ and the B-type is comprised of a first pixel of the B-type $R_1$, a second pixel of the B-type $G_2$, a third pixel of the B-type $R_3$, a fourth pixel of the B-type $G_4$, a fifth pixel of the B-type $B_5$, a sixth pixel of the B-type $G_6$, a seventh pixel of the B-type $R_7$, an eight pixel of the B-type $G_8$ and a ninth pixel of the B-type $R_9$.*

*21. The method of claim 11, further comprising defining R', G' and B' that are representative values of R, G and B at four unit pixel structures with a size of 3×3.*

*22. The method of claim 11, further comprising deciding one of four unit pixel structures with a size of 3×3 that the corresponding unit pixel structure is falling under for performing a color interpolation with respect to the corresponding unit pixel structure.*

*23. The method of claim 11, further comprising performing a color interpolation according to all the discriminated edges by using the surrounding pixels except for the pixels where the edge exists, wherein the color interpolation is performed by making the values of R, G and B identical if the edge exists in the center, thereby lowering a color and emphasizing a brightness.*

*24. A color interpolation method, comprising:*

*obtaining a color image using a semiconductor device, the color image comprising a plurality of unit pixel structures; and*

*determining whether an edge exists in one of a horizontal top direction and a horizontal bottom direction and determining whether the edge exists in one of a vertical left direction and a vertical right direction;*

*wherein the determining the existence of the edge of one of the vertical left direction and the vertical right direction is performed by comparing a changed amount of a left center direction denoted with ΔGLC that is obtained by subtracting the representative green value from the green value in a right portion of a corresponding pixel structure with the changed amount of a right center direction denoted with ΔGRC that is obtained by subtracting the representative green value from the green value in a left portion of the corresponding pixel structure, thereby concluding that the corresponding unit pixel structure has the edge of the vertical left direction as ΔGLC is greater than ΔGRC and concluding that the corresponding unit pixel structure has the edge of the vertical right direction as ΔGRC is greater than ΔGLC.*

*25. The method of claim 24, further comprising determining whether the edge exists in the center as the edge existing in one of the horizontal top direction and the horizontal bottom direction and the edge existing in one of the vertical left direction and the vertical right direction are checked.*

*26. The method of claim 25, wherein the determining the existence of the edge in the center concludes that the edge exists in the center if a difference between ΔGH and ΔGV is greater than a threshold value of a first edge.*

*27. The method of claim 25, wherein the edge exists in the center if a difference between ΔGTC and ΔGBC is less than a second edge.*

*28. The method of claim 25, wherein the edge exists in the center if a difference between ΔGLC and ΔGRC is less than a second edge.*

* * * * *

UNITED STATES PATENT AND TRADEMARK OFFICE

CERTIFICATE OF CORRECTION

PATENT NO. : RE43,479 E
APPLICATION NO. : 13/031377
DATED : June 19, 2012
INVENTOR(S) : Jung It is certified that error appears in the above-identified patent and that said Letters Patent is hereby corrected as shown below:

In Fig. 1D, Sheet 1 of 8, delete "Centerc" and insert -- CenterC --, therefor. (Attached)

In Fig. 5B, Sheet 4 of 8, delete "CHorizental" and insert -- CHorizontal --, therefor at each occurrence throughout the whole figure. (Attached)

In Column 12, Line 7, delete "Gr-type the" and insert -- Gr-type $B_6$, the --, therefor.

In Column 13, Line 65, delete "$C_1$eft" and insert -- Cleft --, therefor.

In Column 17, Line 53, delete "S918" and insert -- S918, --, therefor.

In Column 18, Line 5, delete "Grype" and insert -- GrType --, therefor.

In Column 18, Line 11, delete "Grype" and insert -- GrType --, therefor.

In Column 18, Line 16, delete "Grype" and insert -- GrType --, therefor.

In Column 21, Line 5, in Claim 14, delete "ΔG H" and insert -- ΔGH --, therefor.

Signed and Sealed this
Sixth Day of November, 2012

David J. Kappos

David J. Kappos
*Director of the United States Patent and Trademark Office*

R-Type

R' = CenterC = $R_5$
G' = MissG
B' = CatRB

Gb-Type

R' = $C_1$atG
G' = CenterG = $G_5$
B' = $C_2$atG

Gr-Type

R' = $C_2$atG
G' = CenterG = $G_5$
B' = $C_1$atG

B-Type

R' = CatRB
G' = MissG
B' = CenterC = $B_5$

<$C_1$atG = CTop>

Gb-Type $C_1(R) \Rightarrow CTop = R_2$ (A)

Gr-Type $C_1(B) \Rightarrow CTop = B_2$ (B)

<$C_2$atG = CHorizontal>

Gb-Type $C_2(B) \Rightarrow CHorizental = B_4, B_6$ (A)

Gr-Type $C_2(R) \Rightarrow CHorizental = R_4, R_6$ (B)

<CatRB = CTop>

R-Type

CatRB = CBottom $\Rightarrow B_1, B_3$ (A)

B-Type

CatRB = CBottom $\Rightarrow R_1, R_3$ (B)